US010045335B2

(12) United States Patent
Chen

(10) Patent No.: US 10,045,335 B2
(45) Date of Patent: Aug. 7, 2018

(54) METHOD OF DELIVERING DATA FOR USE BY BASE STATION AND BASE STATION USING THE SAME

(71) Applicant: Acer Incorporated, New Taipei (TW)

(72) Inventor: Pei-Jung Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 147 days.

(21) Appl. No.: 15/173,460

(22) Filed: Jun. 3, 2016

(65) Prior Publication Data

US 2017/0048845 A1     Feb. 16, 2017

Related U.S. Application Data

(60) Provisional application No. 62/205,008, filed on Aug. 14, 2015.

(51) Int. Cl.
| | |
|---|---|
| *H04W 72/04* | (2009.01) |
| *H04W 72/08* | (2009.01) |
| *H04W 4/00* | (2018.01) |
| *H04W 12/06* | (2009.01) |
| *H04W 4/70* | (2018.01) |
| *H04W 76/12* | (2018.01) |
| *H04W 76/02* | (2009.01) |
| *H04W 28/26* | (2009.01) |

(52) U.S. Cl.
CPC ....... *H04W 72/0413* (2013.01); *H04W 4/005* (2013.01); *H04W 4/70* (2018.02); *H04W 12/06* (2013.01); *H04W 72/085* (2013.01); *H04W 76/022* (2013.01); *H04W 76/12* (2018.02); *H04W 28/26* (2013.01)

(58) Field of Classification Search
CPC .......... H04W 72/0413; H04W 76/022; H04W 4/005; H04W 72/085; H04W 12/06; H04W 28/26
See application file for complete search history.

(56) References Cited

U.S. PATENT DOCUMENTS

| 2013/0017779 A1 | 1/2013 | Song et al. |
| 2014/0003357 A1 | 1/2014 | Ejzak et al. |

(Continued)

FOREIGN PATENT DOCUMENTS

| WO | 2014167073 | 10/2014 |
| WO | 2014182338 | 11/2014 |

OTHER PUBLICATIONS

Ericsson et al, "Removing ENs for the Small data fast path solution", 3GPP SA WG2 Meeting S2#98, S2-132786, Jul. 17, 2013, pp. 1-12.

(Continued)

Primary Examiner — Min Jung
(74) Attorney, Agent, or Firm — J.C. Patents

(57) ABSTRACT

The disclosure proposes a method of delivering data applicable to a base station and a base station using the same method. According to one of the exemplary embodiments, the method of delivering data would include not limited to: receiving a service request for an uplink transmission; determining, locally, a quality of service (QoS) parameter, in response to receiving the service request for the uplink transmission; establishing a radio bearer by applying the QoS parameter; receiving a data of the uplink transmission via the radio bearer; buffering the data of the uplink transmission; and transmitting the data.

18 Claims, 8 Drawing Sheets

(56) References Cited

U.S. PATENT DOCUMENTS

2016/0057797 A1* 2/2016 Bangolae .......... H04W 52/0209
370/311
2017/0237815 A1* 8/2017 Arsenault ............... H04L 67/12
709/217

OTHER PUBLICATIONS

"3rd Generation Partnership Project; Technical Specification Group Core Network and Terminals; Non-Access-Stratum (NAS) protocol for Evolved Packet System (EPS); Stage 3 (Release 12)," 3GPP TS 24.301, V12.2.0, Sep. 2013, pp. 1-351.

"3rd Generation Partnership Project; Technical Specification Group Radio Access Network; Evolved Universal Terrestrial Radio Access Network (E-UTRAN); S1 Application Protocol (S1AP) (Release 12)," 3GPP TS 36.413, V12.2.0, Jun. 2014, pp. 1-285.

* cited by examiner

Table 8.3.6.1: ACTIVATE DEFAULT EPS BEARER CONTEXT REQUEST message content

| IEI | Information Element | Type/Reference | Presence | Format | Length |
|---|---|---|---|---|---|
| | Protocol discriminator | Protocol discriminator 9.2 | M | V | 1/2 |
| | EPS bearer identity | EPS bearer identity 9.3.2 | M | V | 1/2 |
| | Procedure transaction identity | Procedure transaction identity 9.4 | M | V | 1 |
| | Activate default EPS bearer context request message identity | Message type 9.8 | M | V | 1 |
| | EPS QoS | EPS quality of service 9.9.4.3 | M | LV | 2-14 |
| | Access point name | Access point name 9.9.4.1 | M | LV | 2-101 |
| | PDN address | PDN address 9.9.4.9 | M | LV | 6-14 |
| 5D | Transaction identifier | Transaction identifier 9.9.4.17 | O | TLV | 3-4 |

Figure 5.3.4.1-1: UE triggered Service Request procedure

9.1.4.1  INITIAL CONTEXT SETUP REQUEST

This message is sent by the MME to request the setup of a UE context.

Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 .. <maxnoofE-RABs> | | | EACH | reject |
| >>E-RAB ID | M | | 9.2.1.2 | | - | |
| >>E-RAB Level QoS Parameters | M | | 9.2.1.15 | Includes necessary QoS parameters. | - | |
| >>Transport Layer Address | M | | 9.2.2.1 | | - | |
| >>GTP-TEID | M | | 9.2.2.2 | | - | |
| >>NAS-PDU | O | | 9.2.3.5 | | - | |
| >>Correlation ID | O | | 9.2.1.80 | | YES | ignore |

FIG. 3 (PRIOR ART)

9.2.1.15  E-RAB Level QoS Parameters

This IE defines the QoS to be applied to an E-RAB.

| IE/Group Name | Presence | Range | IE type and reference | Semantics description |
|---|---|---|---|---|
| E-RAB Level QoS Parameters | | | | |
| >QCI | M | | INTEGER (0..255) | QoS Class Identifier defined in TS 23.401 [11]. Coding specified in TS 23.203 [13]. |
| >Allocation and Retention Priority | M | | 9.2.1.60 | |
| >GBR QoS Information | O | | 9.2.1.18 | This IE applies to GBR bearers only and shall be ignored otherwise. |

FIG. 4 (PRIOR ART)

METHOD OF DELIVERING DATA FOR USE BY BASE STATION AND BASE STATION USING THE SAME

CROSS REFERENCE TO RELATED APPLICATION

This application claims the priority benefit of U.S. provisional application Ser. No. 62/205,008, filed on Aug. 14, 2015. The entirety of the above-mentioned patent application is hereby incorporated by reference herein and made a part of specification.

TECHNICAL FIELD

The present disclosure is directed to a method of delivering data for use by a base station and a base station using the same method.

BACKGROUND

An application of machine type communications (MTC) or Internet of Things (IoT) is to report small data for non-urgent cases. For example water, electric, or gas meters at home may send data to the cloud network in order to deliver such data to users or utility companies. Similarly, temperature or rainfall sensors deployed on mountains may transmit observation data to research institutes or the government. The characteristics pertain to this type of application include small data, device-originated report, non-urgent, and low power consumption. Small data means that a total amount of a transmission could only be a few packets. Non-urgent means that the data does not have to arrive at a destination instantly but is delay tolerant such that in most cases it would not make any difference if the data arrives at a destination 20-30 minutes after it is transmitted.

The current process of transmitting a small data is shown in FIG. 1~FIG. 4 and described by their corresponding written descriptions. A communication system such as the long term evolution (LTE) communication system is a packet-switch system. Under such a system, a user equipment (UE) would require an internet protocol (IP) address to order to access the Internet. In the LTE system, a user equipment may obtain an IP address by performing an Attach procedure.

A typical attachment procedure could be found in 3GPP technical specification 24.301. A relevant section of 5.5.1.2.4 of 3GPP technical specification 24.301 quotes in part ". . . If the attach request is accepted by the network, MME shall send an ATTACH ACCEPT message to the UE and starting timer T3450. The MME shall send the ATTACH ACCEPT message together with an ACTIVATE DEFAULT EPS BEARER CONTEXT REQUEST message contained in the ESM message container information element to activate the default bearer.

A relevant section of 6.4.1.2 of 3GPP technical specification 24.301 quotes in part "The MME shall initiate the default bearer context activation procedure by sending an ACTIVATE DEFAULT EPS BEARER CONTEXT REQUEST message and enter the state BEARER CONTEXT ACTIVE PENDING. When the default bearer is activated as a part of the attach procedure, the MME shall send the ACTIVATE DEFAULT EPS BEARER CONTEXT REQUEST message together with ATTACH ACCEPT and shall not start the timer 3485 . . . ."

FIG. 1 illustrates the content of an Activate Default EPS Bearer Context Request message in accordance with Table 8.3.6.1 of the 3GPP technical specification 24.301. It can be seen from FIG. 1 that the PDN address is an information element of the ACTIVATE DEFAULT EPS BEARER CONTEXT REQUEST message. This means that an IP address can be obtained by a UE during an Attach procedure to a LTE network.

For a LTE network, after a UE has attached to the network, the UE would go to RRC_IDLE mode if the UE has no data to transmit or to receive. After being in RRC_IDLE mode, the UE would need to initiate a Service Request procedure if the UE wants to start transmitting or receiving data once again. FIG. 2 illustrates a signaling diagram of a UE trigger service request procedure in accordance with 3GPP technical specification 24.301. According to FIG. 2 as well as section 5.3.4.1 of the 3GPP technical specification 24.301, if a MTC device such as a home electric or gas or water meter wants to transmit data to a utility company, the MTC device would need to trigger a Service Request procedure by transmitting a Service Request message as shown in step 1 of FIG. 2 in order to transmit the data.

Subsequently, in response to receiving the Service Request, in step 2 an Evolved Node B (eNB) would forward the Service Request to a Mobility Management Entity (MME). In step 3, an Authentication/Security procedure would be performed to authenticate the MTC device. After the MTC device has been authenticated, in step 4, the MME would transmit a S1-AP Initial Context Setup Request message. It is important to note that within the S1-AP Initial Context Setup Request message, the MME would transmit a set of quality of service (QoS) parameters which is selected by the MME along with address of the Serving Gateway (S-GW) as well as a S1 tunnel ID (S1-TEID). In step 5, in response to receiving the S1-AP Initial Context Setup Request message, the eNB would establish a radio bearer with the MTC device. After the radio bearer has been established, in step 6, the MTC device would be able to transmit small data to the eNB which would then forward the small data to the S-GW which would then forward the small data to the packet data network gateway (PDN GW).

In step 7, the eNB would transmit a S1-AP Initial Context Setup Complete message to the MME after procedures associated with step 4 are completed. In step 8, the MME would transmit a Modify Bearer Request message to the S-GW. In step 9, the S-GW may forward the Modify Bearer Request message to the PDN GW. In step 10, the PDN GW would coordinate with a Police and Charging Rules Function (PCRF) to initiate an IP-CAN Session Modification. In step 11, the S-GW may receive a Modify Bearer Response from the PDN GW. In step 12, the Service Request procedure would be completed when the MME receives a Modify Bearer Response message from the S-GW.

To describe step 4 of FIG. 2 with further detail, FIG. 3 illustrates the content of an Initial Context Setup Request message in accordance with 3GPP technical specification 36.413. The Initial Context Setup Request message is sent by a MME to an eNB. A relevant section of 9.1.4.1 of the 3GPP technical specification 36.413 quotes in part "The MME sends S1-AP initial Context Setup Request (Serving GW address, S1-TEID(s) (UL), EPS bearer QoS(s), Security Context, MME Signaling Connection ID, Handover Restriction List, CSG Membership Indication) message to the eNB . . ." It can be seen from FIG. 3 and its corresponding description that the Bearer QoS, the S-GW address, and T1-TEID are contained in the information elements of an Initial Context Request message. Therefore, the Bearer Qos is required by the eNB to allocate radio resource to a MTC UE. The S-GW address and Ti-TEID(s) are used by the eNB to connect to the S-GW so that the eNB would be able to forward small data from a MTC device to a S-GW.

FIG. 4 shows that the E-RAB Level QoS parameters 401 is a part of the information elements which defines the QoS to be applied to an E-RAB as described by section 9.2.1.15 of 3GPP technical specification 36.413. For this disclosure, the 3GPP technical specification 24.301 and 3GPP technical specification 36.413 are incorporated by reference in the way that the definition of the terms used in this disclosure are consistent with definition of the terms used in these technical specifications.

SUMMARY OF THE DISCLOSURE

Accordingly, the disclosure is directed to a method of delivering data for use by a base station and a base station using the same method.

In one of the exemplary embodiments, the disclosure is directed to a method of delivering data for use by a base station. The method would include not limited to: receiving a service request for an uplink transmission; determining, locally, a quality of service (QoS) parameter, in response to receiving the service request for the uplink transmission; establishing a radio bearer by applying the QoS parameter; receiving a data of the uplink transmission via the radio bearer; buffering the data of the uplink transmission; and transmitting the data.

In one of the exemplary embodiment, the disclosure is directed to a base station which would include a wireless receiver; a wireless transmitter; a backhaul link transceiver; a storage medium; and a processor which is coupled to the wireless receiver, the wireless transmitter, the backhaul link transceiver, and the storage medium. The processor is configured at least for: receiving, via the wireless receiver, a service request for an uplink transmission; selecting a quality of service (QoS) parameter in response to receiving the service request for the uplink transmission; establishing a radio bearer by applying the QoS parameter via the wireless transmitter and the wireless receiver; receiving, via the wireless receiver, a data of the uplink transmission via the radio bearer; buffering the data of the uplink transmission in the storage medium; and transmitting the data via the backhaul transceiver.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 illustrates the content of an Activate Default EPS Bearer Context Request message in accordance with 3GPP technical specification 24.301.

FIG. 3 illustrates the content of an Initial Context Setup Request message in accordance with 3GPP technical specification 36.413.

FIG. 4 illustrates the E-RAB Level QoS parameters in accordance with 3GPP technical specification 36.413.

DETAILED DESCRIPTION OF DISCLOSED EMBODIMENTS

Figure 2:
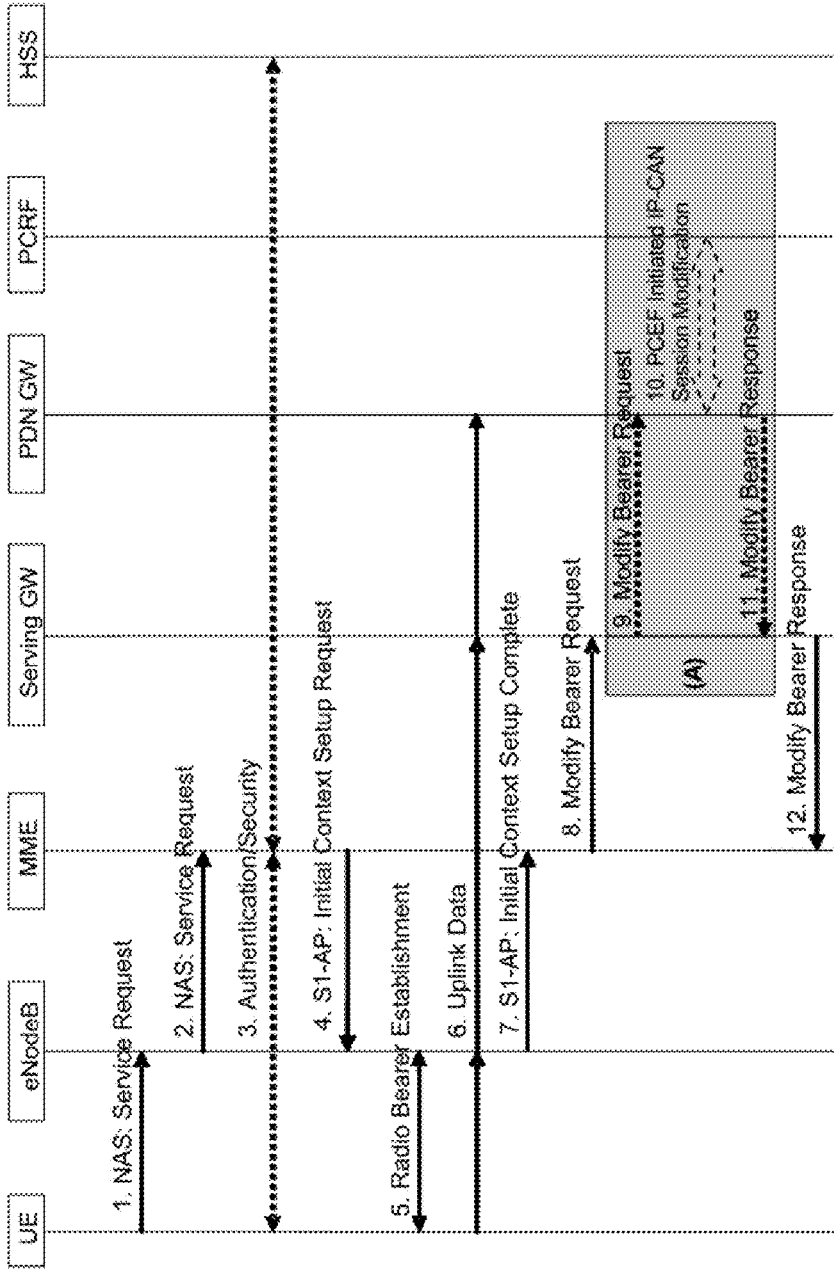
FIG. 2 illustrates a signaling diagram of a UE trigger service request procedure in accordance with 3GPP technical specification 24.301.

Reference will now be made in detail to the present exemplary embodiments of the disclosure, examples of which are illustrated in the accompanying drawings. Wherever possible, the same reference numbers are used in the drawings and the description to refer to the same or like parts.

This disclosure provides a solution for non-urgent uplink small data transmission for MTC/IoT applications. An overall concept used in this proposal is to separate the radio bearer handlings from the setup of S1-U connection. More concretely, one of the concept is for the eNodeB and the UE to negotiate and to decide the proper radio bearer QoS parameters locally. In this way, the decision for selecting QoS parameters does not have to be made by a MME. Another concept is that the eNodeB would buffer the UE uplink data before the core network connection setup complete.

For a typical communication system such as LTE system, if a UE needs to access the network, the UE would need to perform radio resource control related procedures in order to attach to network. Therefore, a MTC device would need to establish a RRC connection, enter a RRC_CONNECTED mode, and perform an Attach procedure in order to transmit data through the network to a destination. After completing the Attach procedure, the MTC device will obtain an IP address so as to start transmitting or receiving data. If subsequently the MTC device has no data to receive or transmit, the MTC device will enter a RRC_IDLE mode. In the RRC_IDLE mode, the radio bearer resource between MTC device and base station such an eNB will be released. Also the base station will remove the UE's context. If a MTC device operating in RRC_IDLE mode wants to transmit data, the MTC device would initiate a Service Request to re-establish radio bearer.

As described previously a legacy LTE Service Request procedure will go through a MME which would then send a S1-AP Initial Context Setup Request message to an eNB to restore the MTC UE's context. The content of the S1-AP Initial Context Setup Request message would include a S-GW address, a S1-TEID(s) (UL), an EPS Bearer QoS(s), a Security Context, and etc. In other words, the S1-AP Initial Context Setup Request will transmit to an eNB the E-RAB QoS parameters for radio bearer establishment as well as the address of a S-GW and a S1-TEID for the eNB to forward data to a S-GW. The eNB will first complete the Initial Context Setup procedure and then establish a radio bearer. After both core network (S1-U) connection and radio bearer are established, the UE would then able to start transmitting uplink data.

In this way, the QoS parameter is determined by the MME, and the progress would transpire as a UE to eNodeB, to MME, to eNodeB, and to UE. However, for applications that transmit only small data such as a gas/water/electric meter reading, an uplink could be just several small packets. Therefore, it is unnecessary to allocate much radio resource at all and is also unnecessary to apply complex QoS parameters to maintain the core network bearer. Also, there is no need for an eNB to deliver the uplink data instantaneously. If a MTC UE would be able indicate to an eNB that the uplink request is for MTC/IoT non-urgent small data, then the eNB may locally decide a radio bearer QoS to connect with the MTC UE instead of to waiting for the MME to assign QoS parameters.

Thus, in this disclosure it is proposed that the radio bearer QoS decision would then be excluded from Initial Context Setup procedure. It is proposed to allow a UE and eNB to first establish a radio bearer. After the establishment of the radio bearer has been completed, the UE would then send small data packets to the eNB. The eNB would buffer these small data packets. It is worth noting that the eNB does not buffer data from a UE in a legacy LTE system. The eNB would have to option to establish the S1-U connection much later. For example, if the network traffic of a core network is high, the eNB may decide to wait until the congestion of the network traffic of the core network is lessened before attempt to establish the S1-U connection. Once the S1-U connection is complete, the eNB may then forward the buffered data to the S-GW.

One of the advantages of the proposal is that a UE may start to transmit an uplink data to an eNB earlier because the eNB does not have to wait for the QoS decision from a MME. Also the eNodeB is not compelled to establish a S1-U connection and to forward data as soon as possible but instead would be able to establish S1-U connection and forward data to serving gateway at any time at its own leisure. This can be useful when the core network is congestion. By buffering these non-urgent small data, the eNB may allow the MTC/IoT device to have efficient power usages.

Figure 5:
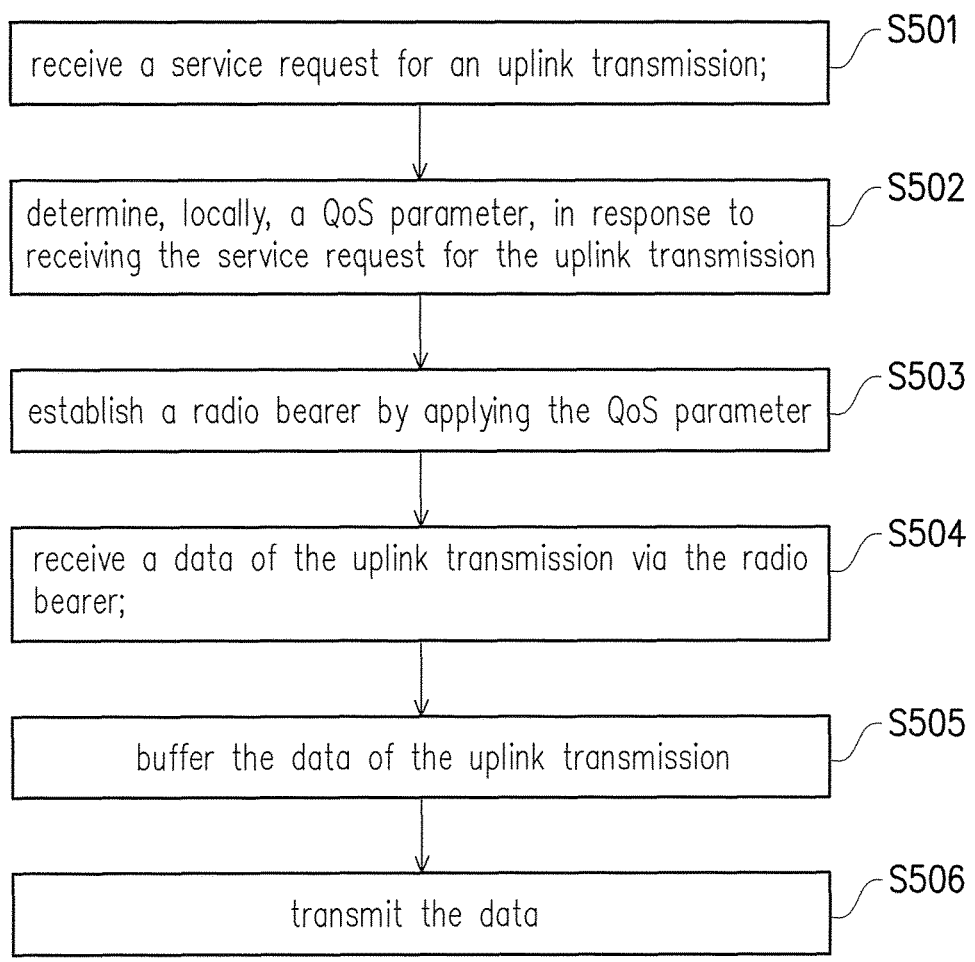
FIG. 5 illustrates a proposed method of delivering data for use by a base station in accordance with one of the exemplary embodiments of the disclosure.

The proposed method of delivering data is described is shown in FIG. 5. The proposed method is described from the perspective of a base station in accordance with one of the exemplary embodiments of the disclosure. In step S501, the base station would receive a Service Request message for an uplink transmission. The Service Request message could be initiated from a UE. In step S502, the base station would determine, locally, a QoS parameter, in response to receiving the Service Request for the uplink transmission. In other words, the QoS parameter for a subsequent radio bearer setup is not determined by a MME but is determined by the base station. In step S503, the base station would establish a radio bearer by applying the QoS parameter. In step S504, the base station would receive the data of the uplink transmission via the radio bearer. In step S505, the base station would buffer the data of the uplink transmission. In step S506, the base station would transmit the data. In other words, the base station may forward the data to a core network device such as a S-GW.

According to one of the exemplary embodiments, the QoS parameter is determined by the eNB without receiving an Initial Context Setup Request message.

According to one of the exemplary embodiments, the base station would initiate a backhaul connection at some point in time after buffering the data of the uplink transmission, but the backhaul connect does not have to be initiated instantly in response to receiving the data in the buffer.

According to one of the exemplary embodiments, the base station may receive a small data indicator which indicates that the uplink transmission contains only non-urgent small data. The small data indicator could be received during a RRC connection procedure.

According to one of the exemplary embodiments, the base station may receive a set of preferred QoS parameters from an UE in response to receiving the small data indicator which indicates that the uplink transmission contains only non-urgent small data of a machine type communication (MTC) device. The base station could then determine whether to apply the preferred set of Qos parameters received from the UE as the QoS for the uplink transmission or to apply a different set of QoS parameters. Alternatively, the base station may apply a predetermined set of QoS parameter in response to receiving the small data indicator.

According to one of the exemplary embodiments, the aforementioned initiating the backhaul connection would include transmitting an uplink small data request and receiving an initial context setup request which is without any QoS parameter but comprises a serving gateway address and a S1-tunnel endpoint identifier (S1-TEID) in response to transmitting the uplink small data request. The base station may subsequently transmit the data by applying the serving gateway address and the S1-TEID.

According to one of the exemplary embodiments, determining, locally, the quality of service (QoS) parameter, in response to receiving the service request for the uplink transmission is performed after an authentication procedure to authenticate a machine type communication (MTC) device. An uplink small data request could be transmitted before performing the authentication procedure in response to receiving the Service Request message for the uplink transmission.

Figure 6:
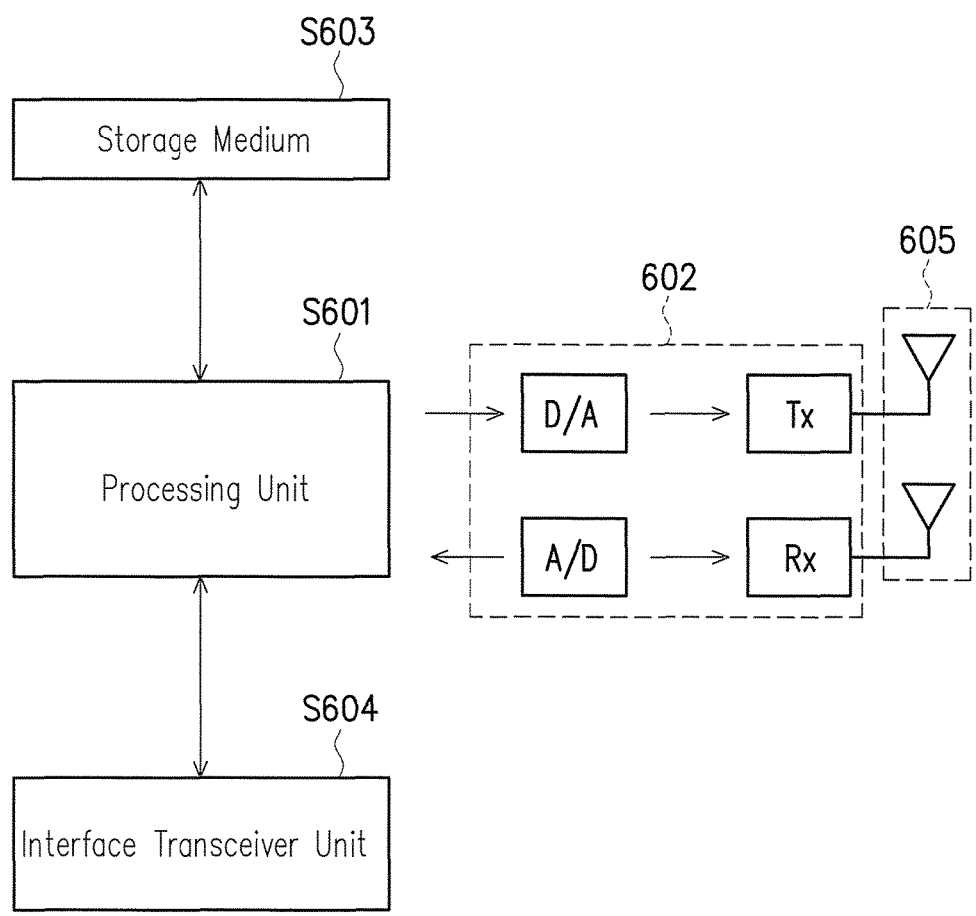
FIG. 6 illustrates a base station in terms of functional block diagrams in accordance with one of the exemplary embodiments of the disclosure.

FIG. 6 illustrates a base station in terms of functional block diagrams in accordance with one of the exemplary embodiments of the disclosure. The base station would include not limited to a processing unit 601 electrically coupled to a RF transmitter/receiver 602, a storage medium 603, an interface transceiver unit 604, and an antenna unit 605. The RF transmitter/receiver 602 may contain not limited to a RF transmitter (Tx), a RF receiver, an analog-to-digital (A/D) converter, and a digital-to-analog (D/A) converter. The transmitter transmits wireless signals, and the receiver receives wireless signals. The transmitter and receiver may also perform operations such as low noise amplifying, impedance matching, frequency mixing, up or down frequency conversion, filtering, amplifying, and so like. The (A/D)/(D/A) converter is configured to convert signals from an analog signal format to a digital signal format/from a digital signal format to an analog signal format.

Figure 7:
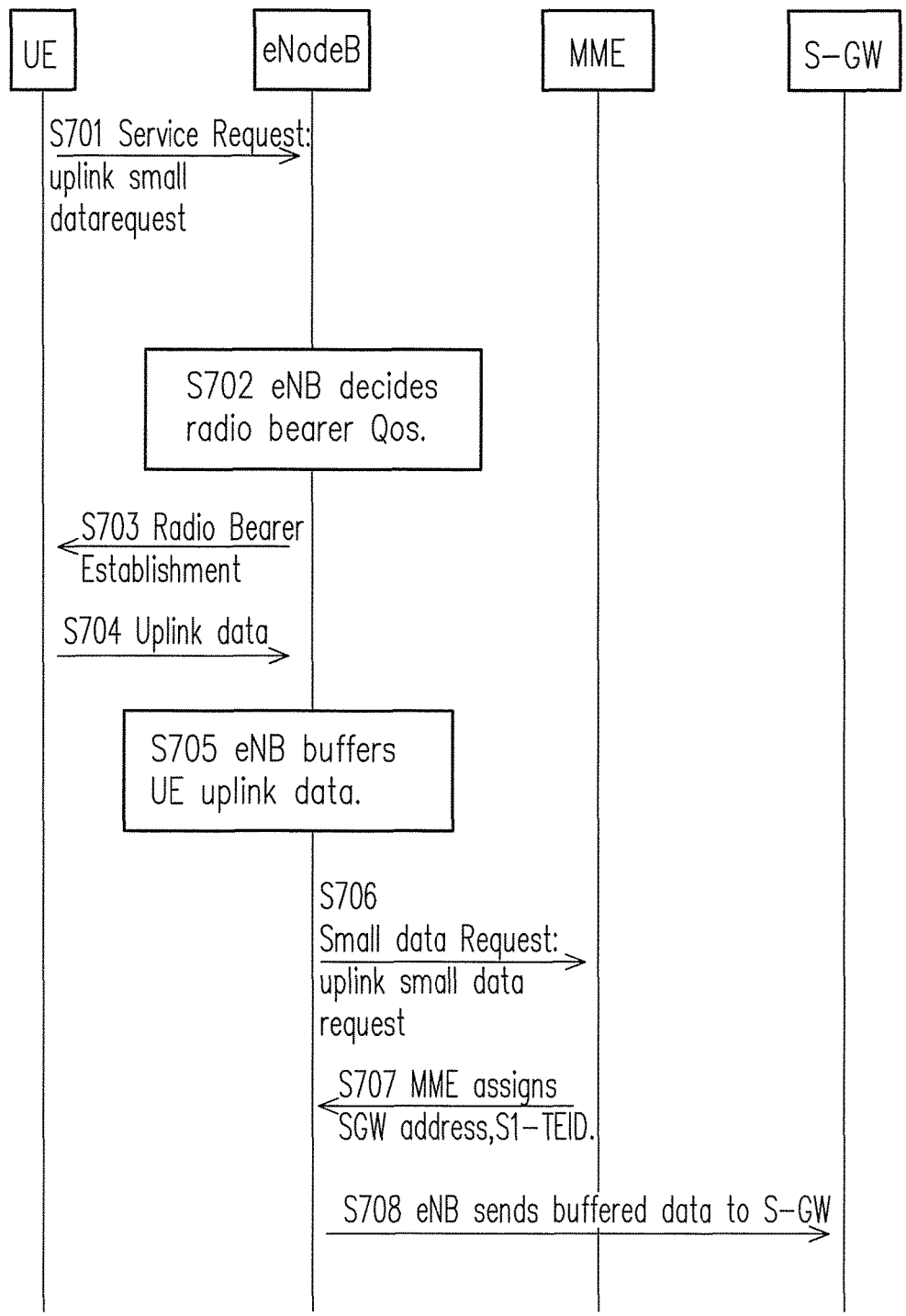
FIG. 7 illustrates a first exemplary embodiment of the proposed method of delivering data for use by a base station.
Figure 8:
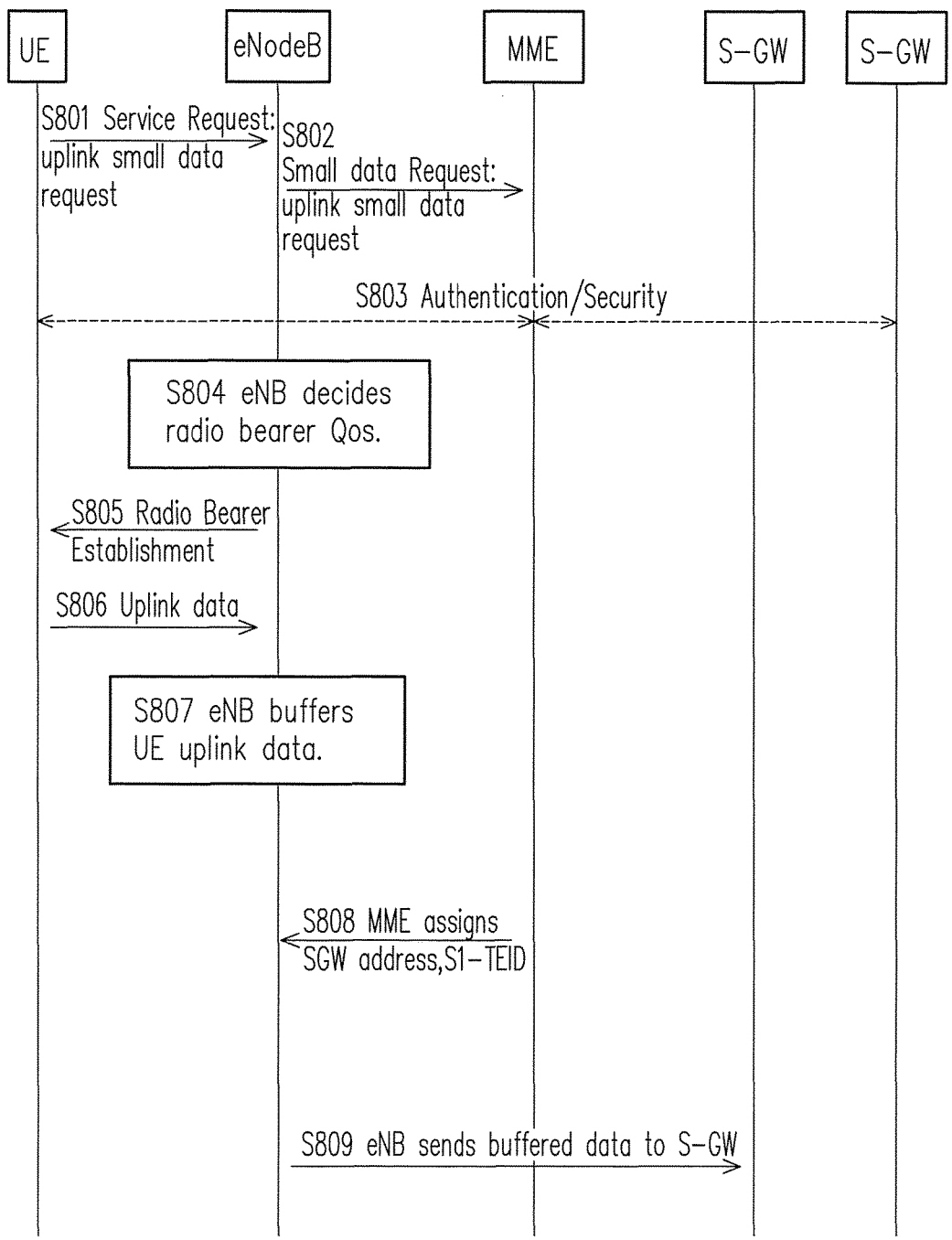
FIG. 8 illustrates a second exemplary embodiment of the proposed method of delivering data for use by a base station.

The processing unit 601 is configured to process digital signal and to control and perform the procedures of the proposed method described in FIG. 5, FIG. 7, FIG. 8 and their corresponding written descriptions. The functions of the processing unit 601 could be implemented by using one or more programmable units such as a micro-processor, a micro-controller, a DSP chips, FPGA, etc. The functions of the processing unit 601 may also be implemented with separate electronic devices or ICs, and the functions performed by the processing unit 601 may be implemented within the domain of either hardware or software.

The processing unit 601 is coupled to a non-transitory memory module 603 to store programming codes, device configurations, a codebook, buffered UE data or permanent data, and so forth. The Interface Transceiver unit 604 may include one or more transceivers for facilitating various backhaul connections such as the S1 connection or inter-base station connections such as the X2 connection. The Interface Transceiver unit 604 could be used to connect to a MME of a core network. The antenna unit 605 contains at least one antenna or an array of antennas for transmitting and receiving wireless signals.

To describe the proposed method of FIG. 5 in further detail, FIG. 7 illustrates a first exemplary embodiment of the proposed method of delivering data. The procedures are described from the perspective of a base station. The first exemplary embodiment would be applicable for a base station to receive a small non-urgent data from a MTC device and subsequently forwarding to the small non-urgent data to a core network. The small non-urgent data could be just a few packets long and does not have to get to the destination in a real time or in any hurry. The proposed method is improvement over the traditional method for transmitting small non-urgent data.

In step S701, the (MTC) UE would initiate a Service Request message to the eNB. In RRC layer, there could be a small data indicator which indicates that the Service Request message is an uplink small data request which could be a request for forwarding small non-urgent data from a MTC device. In this way, the eNB would be able to implement the proposed method of forwarding data rather than the established method.

Also in the RRC layer, the UE might be able to indicate the preferred QoS parameters set for the small non-urgent data uplink. In one variation of the step S702 first exemplary embodiment, the UE would transmit a preferred QoS parameters set for the small non-urgent data uplink to the eNB. The eNB may store a pre-defined QoS parameter book in a storage medium (e.g. 603), and the pre-defined QoS parameter book contains more than one QoS set of parameters. A UE may indicate the preferred QoS set in the uplink RRC layer indicator, but the eNB would subsequently decide the QoS parameter set either based on the preference of the UE or based on eNB's own determination regardless of UE's recommendation.

In an alternative variation of the step S702 of first exemplary embodiment, the pre-defined QoS parameter book would contain only one QoS set of parameters. Every time when the eNB receives a small data indicator which indicates that the Service Request message is an uplink small data request, the eNB would apply this only one QoS parameter set to establish a radio bearer.

In step S703, the eNB would establish a radio bearer with the UE by applying the QoS parameter set which the eNB has locally determined. After the radio bearer has been established, in step S704, the UE would transmit uplink data to the eNB via the radio bearer. If the UE is a MTC UE, the uplink data might be small non urgent data containing of only a few packets. In step S705, the eNB would store the uplink data from the UE in a storage medium (e.g. 603) to be forwarded either instantly or at a later time under suitable conditions such as when the core network is not congested. It should be noted that S703 and S704 would be similar to established procedures, but established procedure typically would have no reason to buffer uplink data for transmission at a later time but instead would transmit the uplink data immediately.

In step S706, in response to having small non-urgent data in its buffer, the eNB would transmit an Uplink Small Data Request to the MME. The Uplink Small Data Request is modified from the established Service request. The purpose of step S706 is to signal the MME a 'Light' Initial Context Setup Request. In response to receiving the 'Light' Initial Context Setup Request, the MME would transmit a response which does not include QoS parameters but includes elements such as S-GW address and S1-TEID(s) for the eNB to establish a S1-U connection with the S-GW. It should be noticed that step S706 could be performed regardless of whether steps S702~S706 has been performed or not. Because the disclosure is aimed to separate the radio bearer establishment (i.e. steps S702~S705) and the S1-U connection (steps S706~S707), the order of the procedures shown in FIG. 7 may contain various other possibilities which would be obvious for an ordinary person skilled in the art.

In step S707, the MME would transmit to the eNB a modified S1-AP Initial Context Setup Request message which includes a S-GW address and a S1-TEID but does not include any QoS parameter. Upon receiving the Uplink Small Data Request from eNB in step S705, the MME would obtain the S-GW address and the S1-TEID which corresponds to the UE's context. The MME would then send these information to eNB so that the eNB would be able to establish the S1-U connection with S-GW and forward buffered data to S-GW. In step S708, the eNB would forward the buffered uplink small data packets to a S-GW.

FIG. 8 illustrates a second exemplary embodiment of the proposed method of delivering data. The procedures are described from the perspective of a base station. In step S801, the (MTC) UE would initiate a Service Request message to the eNB. The step S801 would be the same as step S701 and thus a repetition of written descriptions would not be necessary. The step S801 may also include a small data indicator which indicates that the Service Request message is an uplink small data request which could be a request for forwarding small non-urgent data from a MTC device. In this way, the eNB would be able to implement the proposed method of forwarding data rather than the established method.

In step S802, the eNB would transmit an Uplink Small Data Request to the MME. The content and purpose of the Uplink Small Data Request would be the same as step S706 and thus a repetition of written descriptions would not be necessary. In step S802, the eNB communicate to the MME that the uplink request is for MTC/IoT small data. The MME may then decide when to assign the address of the S-GW and S1-TEID to the eNB based on the status of the core network at MME's own leisure. In step S803, the network would perform an Authentication/Security procedure for the UE. Only if the UE is properly authenticated, the rest of the procedures would ensue. In other words, only if step S803 is performed successfully, the rest of the steps could be performed. The Authentication/Security Procedures are performed between the MME and the HSS.

Alternatively, in step S802 when the eNB sends an Uplink Small Data Request to MME, MME may determine whether Authentication/Security procedure would be necessary. Only if the Authentication/Security procedure is deemed necessary, MME will perform S803. Otherwise, step S803 would be skipped.

In step S804, the eNB would determine locally the QoS parameter for the subsequent radio bearer establishment. In step S805, the eNB would establish the radio bearer with the UE. In response to the radio bearer being established, in step S806, the UE would then transmit small uplink data to the eNB. Steps S804~S806 are the same as steps S702~S704. In step S807 which is the same as step S705, the eNB would buffer the received small uplink data from the UE. In step S808, which is the same as step S707, the eNB would receive from the MME the S-GW address and the S1-TEID which corresponds to the UE. In step S809, which is the same as step S708, the eNB would forward the buffered small data to the S-GW.

In view of the aforementioned descriptions, the disclosure is suitable for being used in a wireless communication system and would provide an enhancement for non-urgent uplink small data transmission for MTC/IoT applications. In this disclosure the radio bearer QoS decision is separated from legacy S1-AP Initial Context Setup procedure. The eNodeB may decide, locally, the radio bearer QoS parameters and may establish radio bearer without first communicating with a MME. Before the S1-U connection setup is completed, the eNodeB may buffer the received UE small packets.

This disclosure also allows a (MTC) UE to start transmitting uplink small data earlier, and as a result would allow the UE to have more sleep time. Moreover, this disclosure gives a communicate system more flexibility, which more concretely means that the core network or the base station may decide to when process the MTC/IoT non-urgent small data later on their own accord since the disclosure separates out the radio access procedures and the core network connection procedures.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of delivering data for use by a base station, the method comprising:
   receiving a service request for an uplink transmission;
   determining, locally, a quality of service (QoS) parameter, in response to receiving the service request for the uplink transmission, comprising:
   receiving a preferred QoS, and
   applying the preferred QoS as the QoS for the uplink transmission;
   establishing a radio bearer by applying the QoS parameter;
   receiving a data of the uplink transmission via the radio bearer;
   buffering the data of the uplink transmission; and
   transmitting the data.

2. The method of claim 1, wherein determining, locally, the QoS parameter, in response to receiving the service request for the uplink transmission further comprising:
   determining, locally, the QoS parameter without receiving an initial context setup request.

3. The method of claim 2, further comprising:
   initiating a backhaul connection after buffering the data of the uplink transmission.

4. The method of claim 3, wherein initiating the backhaul connection comprising:
   transmitting an uplink small data request; and
   receiving an initial context setup request which is without any QoS parameter but comprises a serving gateway address and a S1-tunnel endpoint identifier (S1-TEID) in response to transmitting the uplink small data request.

5. The method of claim 4 further comprising:
   transmitting the data by applying the serving gateway address and the S1-TEID.

6. The method of claim 1, wherein receiving the service request for the uplink transmission further comprising:
   receiving a small data indicator which indicates that the uplink transmission contains only non-urgent small data.

7. The method of claim 6, wherein determining, locally, the QoS parameter, in response to receiving the service request for the uplink transmission comprising:
   applying a predetermined set of QoS parameter in response to receiving the small data indicator which indicates that the uplink transmission contains only non-urgent small data of a machine type communication (MTC) device.

8. The method of claim 1, wherein the step of determining, locally, the quality of service (QoS) parameter, in response to receiving the service request for the uplink transmission is performed after an authentication procedure to authenticate a machine type communication (MTC) device.

9. The method of claim 8 further comprising:
   transmitting, by the base station, an uplink small data request before performing the authentication procedure in response to receiving the service request for the uplink transmission.

10. A base station comprising:
    a wireless receiver;
    a wireless transmitter;
    a backhaul link transceiver;
    a storage medium; and
    a processor coupled to the wireless receiver, the wireless transmitter, the backhaul link transceiver, and the storage medium, wherein the processor is configured at least for:
    receiving, via the wireless receiver, a service request for an uplink transmission, comprising:
    receiving, via the wireless receiver, a preferred QoS, and applying the preferred QoS as the QoS for the uplink transmission;
    selecting a quality of service (QoS) parameter in response to receiving the service request for the uplink transmission;
    establishing a radio bearer by applying the QoS parameter via the wireless transmitter and the wireless receiver;

receiving, via the wireless receiver, a data of the uplink transmission via the radio bearer;

buffering the data of the uplink transmission in the storage medium; and transmitting the data via the backhaul transceiver.

11. The base station of claim 10, wherein the processor is configured for selecting the QoS parameter, in response to receiving the service request for the uplink transmission further comprising:

selecting the QoS parameter without receiving an initial context setup request via the backhaul transceiver.

12. The base station of claim 11, wherein the processor is further configured at least for:

initiating, via the backhaul transceiver, a backhaul connection after buffering the data of the uplink transmission.

13. The base station of claim 12, wherein the processor is configured for initiating the backhaul connection comprising:

transmitting, via the backhaul transceiver, an uplink small data request; and receiving, via the backhaul transceiver, an initial context setup request which is without any QoS parameter but comprises a serving gateway address and a S1-tunnel endpoint identifier (S1-TEID) in response to transmitting the uplink small data request.

14. The base station of claim 13, wherein the processor further configured at least for:

transmitting, via the backhaul transceiver, the data by applying the serving gateway address and the S1-TEID.

15. The base station of claim 10, wherein the processor is configured for receiving, via the wireless receiver, the service request for the uplink transmission further comprising:

receiving, via the wireless receiver, a small data indicator which indicates that the uplink transmission contains only non-urgent small data.

16. The base station of claim 15, wherein the processor is configured for selecting the QoS parameter in response to receiving the service request for the uplink transmission comprising:

applying a predetermined set of QoS parameter in response to receiving via the wireless receiver the small data indicator which indicates that the uplink transmission contains only non-urgent small data of a machine type communication (MTC) device.

17. The base station of claim 10, wherein the processor is configured for selecting the quality of service (QoS) parameter, in response to receiving the service request for the uplink transmission occurs after the processor performs an authentication procedure to authenticate a machine type communication (MTC) device.

18. The base station of claim 17, wherein the processor is further configured for:

transmitting, via the backhaul transceiver, an uplink small data request before performing the authentication procedure in response to receiving via the wireless receiver the service request for the uplink transmission.

* * * * *